Oct. 13, 1970    L. H. MATHEWS    3,534,134
METHOD OF ELIMINATING CURVATURE FROM BOWED OR
WARPED FOAMED POLYVINYL CHLORIDE SHEETS
Filed July 2, 1968

INVENTOR.
LINDEN H. MATHEWS
BY
John A. McKinney
ATTORNEY

United States Patent Office 3,534,134
Patented Oct. 13, 1970

---

3,534,134
METHOD OF ELIMINATING CURVATURE FROM BOWED OR WARPED FOAMED POLYVINYL CHLORIDE SHEETS
Linden Hannan Mathews, High Bridge, N.J., assignor to Johns-Manville Corporation, New York, N.Y., a corporation of New York
Filed July 2, 1968, Ser. No. 742,061
Int. Cl. B29d 7/22
U.S. Cl. 264—321         3 Claims

ABSTRACT OF THE DISCLOSURE

The invention is directed to a process for the removal of warpage from polyvinyl chloride foam which, in a preferred embodiment includes: subjecting the surfaces of the warped foam to temperatures ranging from about 280 degrees Fahrenheit to about 300 degrees Fahrenheit, and promptly thereafter subjecting the heated warped sheet of foam to a stress of about 25 to about 30 pounds per square inch for a period of about 50 to about 70 seconds, in a press, in a direction opposite to the original warpage in an amount sufficient to flex the warped material in a direction opposite to the original direction of warp, the flexed sheet of the composition having temporarily a reverse, i.e., negative, warpage approximately equivalent to the original positive warpage, and cooling the heated composition while under the stress. Thereby, when the cooled sheet of the polyvinyl chloride foam is removed from the stress, the resulting sheet is substantially straightened and without the original warpage.

---

Figure 1:
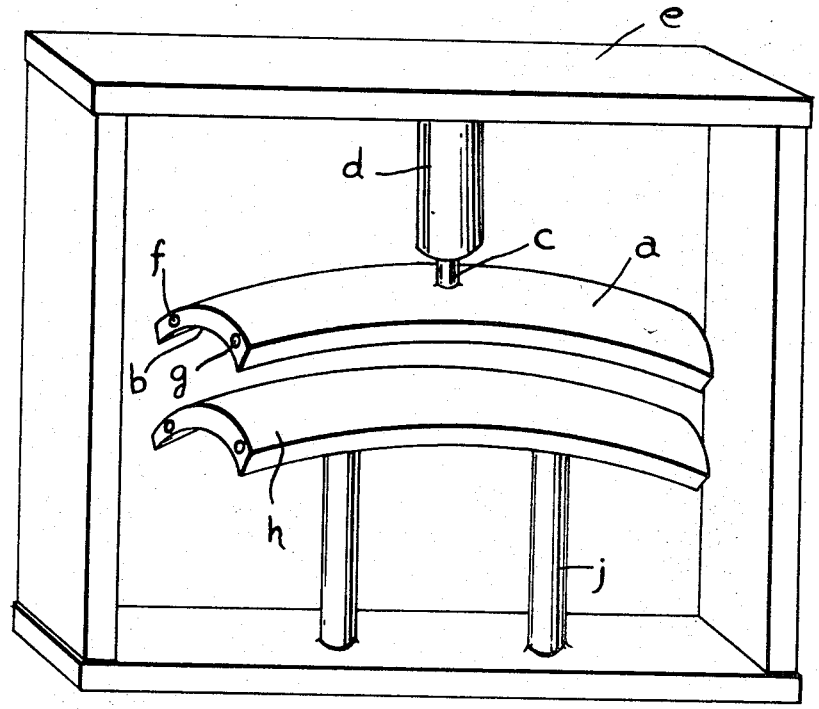

This invention relates to a novel process for treating any of various warped substantially rigid thermoplastic cellular compositions such as preferably polyvinyl chloride foamed sheets characterized by a warped shape which prior to this invention would render such sheets unsuitable for various commercial uses. The warped condition of the sheets is substantially if not entirely removed by the process of this invention.

BACKGROUND

Prior to this invention, numerous rigid thermoplastic cellular compositions have been discovered, each of which has its desirable properties as well as its shortcomings such as varying degrees of inflammability, frangibility, compressive strength, and the like. Typical of these types of compositions are the foams of polyvinyl chloride, polyethylene polymer, polyvinylidene halide, acrylonitrile-butadiene-styrene, polytetrachloroethylene, and various silicone polymers of the rigid type.

The problems to which this invention is directed are believed to arise from the method of producing the polyymeric foams.

The various processes of making these different foams of the type described above, are at least often similar to the extent that the foam is grown as a result of initial reactions forming the cellular structure, which is blown into the form of a foam as a result of a blowing agent such as carbon dioxide being released therein as a part of the overall reaction in the production of the foam.

Typical of these polymeric foams is a cross-linked polyvinyl chloride foam. In the production of this foam, maleic anhydride and toluene diisocyanate are each reacted with water to produce maleic acid and an amine, the two reaction products reacting with each other to produce an amide linkage between the difuctional maleic acid and the difunctional isocyanate, and to produce carbon dioxide, the carbon dioxide serving to blow the composition into the form of a foam. Prior to placing the molded mass into hot water for the above reaction, the molded mass is normally referred to as the embryo. The resulting finally cross-linked foam formed when the embryo is placed into the hot water is normally referred to as a bun. After a bun has been formed, in addition to the necessity of removing the outer skin of the bun which is in the form of a surface film, it is necessary to saw the bun into various slabs thereafter referred to as sheets, if the bun is of a thickness greater than the desired thickness of a single sheet. For reasons not fully understood, the resulting sawed sheets each often promptly assume a distorted shape normally referred to as a warped condition in which the sheets assume a relatively convex shape on one side and a corresponding concave shape on the other side of the sheet. Warpage curvature of the face of the rectangular sheet in which the opposite ends of the sheet both curve upward (or both curve downward) whereby the lengthwise face curves around an axis extending transversely across the sheet, is hereafter referred to as longitudinal warpage. Warpage curvature of the opposite edges of a face of the sheet, curving both upward (or both downward) around an axis extending longitudinally along the length of the sheet, is hereafter referred to as transverse warpage.

Many contemplated uses for sheets of this type are immediately eliminated for sheets containing a significant degree of the warped condition. For example, cross-linked polyvinyl chloride foam is advantageously employed as a part of the safety barrier surrounding a hazardous potentially explosive area. In such a use, a sheet of polyvinyl chloride foam is adhesively laminated with a sheet of stainless steel, and the laminated sheet of foam and stainless steel is bolted to the concrete barrier wall, with the foam side of the laminate sheets facing the concrete. In the process of laminating the polyvinyl chloride foam with the stainless steel sheets, the foam and the stainless steel materials are placed face to face with an adhesive between the opposing faces, and in the sandwiched condition are fed between opposing rollers which serve to seal the sandwiched sheets of foam and stainless steel into a laminate. If the polyvinyl chloride foam sheet is in a substantially warped condition more than a minimal insignificant degree, the polyvinyl chloride sheet promptly cracks near the outer edges when the sandwiched foam and stainless steel are fed through the opposing rollers to form a laminate.

The significance of the invention is emphasized by the fact that at the time of the invention, the polyvinyl chloride foamed sheets were the only type of foam presently approved by particular engineers for this use as a part of the barrier around particular explosive reactors. One of the reasons for the approval of this particular type of fire-resistant foamed sheet is the particularly desirable properties of this sheet, such as compressive strength (expressed by the engineer in terms of elasticity). The particular specifications permit only very narrow limits of variation in thickness due to compression. Accordingly, any effort to correct the warpage problem discussed above had to be by way of a process which would not materially impair the compressive strength of the polyvinyl chloride foamed sheet and which would not significantly reduce the thickness (and thereby increase the density) of the sheet. In one unsuccessful effort to overcome the problem of warpage, it was found that the compressive strength as well as the thickness (and therefore the density) of a sheet would be substantially reduced if subjected to pressure in the absence of heat. Efforts to correct the warpage by employing merely heat failed, the heat serving to cause the foam to shrink (thereby affecting compressive strength, thickness, and density) if heat above a certain range is employed; for example when heated in an oven, the degree of warpage tended to significantly increase in the already warped sheets. In another attempt to solve the warpage problem, when a warped polyvinyl chloride foamed sheet was heated in the oven within a range of about 280 degrees Fahrenheit to about 300 degrees Fahrenheit for from about 2 to 4 minutes, blisters appeared on the surface of the sheet, thereby further destroying the utility of the sheets of polyvinyl chloride foam.

Thus, although considerable efforts have been made in the past to remove this warpage, and although all these efforts to solve the problem had failed in the past, the inventor unexpectedly discovered a process and an apparatus for use in the process, by which the longitudinal warp of the face of the polyvinyl chloride sheet may be removed. After the removal of the longitudinal warpage by the process of this invention, it was found that the sandwiched foam and stainless steel could be laminated without the breaking of the polyvinyl chloride sheet. However, when securing the laminated foam and stainless steel to a slightly concave wall, it was found that the polyvinyl chloride foam developed cracks therein arising from some of the points at which the laminate was bolted (through holes in the laminate) to the wall. Again, after the failure of other efforts, the applicant's process was again employed to remove the warpage also in the transverse plane, i.e., curvature across the face of the sheet of foam. Thereby, the warpage had been substantially removed both longitudinally and transversely from the sheet of foam by the process of this invention. It was found that the sandwiched sheet of stainless steel with the foam from which the transverse and longitudinal warpages had been removed could be easily and successfully laminated without cracking when passed through the rollers and could be secured to the concave wall by bolts inserted through holes through the laminate without the occurrence of any cracking of the polyvinyl chloride foamed sheets. It was determined thereafter that it is also desirable to simultaneously remove both the longitudinal and the transverse warps.

As the process of this invention was developed, it was found that in order to overcome the problem of the polyvinyl chloride sheet cracking as a result of transverse warpage, the cracking occurring when the laminate is secured to the concrete wall, although it is not essential to entirely eliminate all traces of the transverse warpage, it is preferred that the transverse warpage be substantially eliminated. If the warpage is permitted to increase, there exists solely a very narrow and critical difference in the amount of warpage which if present invariably results in a cracking of the polyvinyl sheet when the laminate is bolted to the concave wall.

THE OBJECTS

An object of this invention is a novel process for converting a substantially warped sheet of substantially rigid thermoplastic cellular composition such as cross-linked polyvinyl chloride foam into a substantially flattened condition substantially free of warp.

Another object is a novel process for removing either or both the transverse and longitudinal warp from a sheet of a substantially rigid thermoplastic cellular composition.

Another object is to remove warp from a sheet of a substantially rigid thermoplastic cellular composition such as polyvinyl chloride foam without substantially impairing either the compressive strength or the thickness of the sheet.

Other objects become apparent from the above and following disclosure.

SUMMARY OF THE INVENTION

The above objects are fulfilled by the process of this invention. The process of this invention may be practiced either by use of a particular apparatus of the type illustrated in the FIG. 1, or in the absence of the above-referred-to apparatus by other means as shall be described hereafter. It has been unexpectedly discovered that a bowed or convex face of a sheet of foam, resulting from a warping of a sheet of foam, may be substantially if not entirely eliminated by a process which comprises subjecting a convexly warped face of a layer of a substantially rigid thermoplastic cellular composition (having a surface temperature—normally resulting from heating—of at least about a minimum temperature necessary for flexing said convexly warped face into a reverse degree of concave curvature up to a maximum temperature above which compressive strength or thickness substantially is reduced) to a stress in an amount sufficient to temporarily impart and hold said convexly warped face in a predetermined concave curvature about equivalent to said convexly warped face, said amount of stress being limited to a maximum pressure exertion per square inch above which damaging pressure would substantially reduce said compressive strength or said thickness, and substantially cooling said composition while said concave face is retained under said stress, whereby said convexly warped face results in a substantially flat and unwarped face when removed from said stress. A heating means preferably is employed which will rapidly raise the surface temperature of at least the concave face opposite the convexly warped face to at least the necessary minimum temperature preferably before the deeper interior of the foam also increases in temperature to a corresponding degree, and which will restrain the foamed sheet being heated to avoid additional warp during the heating. A preferred process employs heating platens in actual heat-transfer-contact with preferably both of opposite surfaces of the warped sheet of foam, but at least with the warped concave surface. The minimum surface temperature which is necessary for the process will vary depending upon the particular chemical composition of the foam being employed in this process. If in fact a particular foam composition being employed does not require any heating in order to flex a sheet thereof into a reverse degree of concave curvature, it follows that the "sufficiently cooling" after subjecting the convex face of the sheet of foam to the necessary stress to impart and hold in a concave curvature approximately equivalent to the initial degree of convex curvature, may be no cooling at all, or possibly may be only a sufficient amount of cooling possibly exothermed as a result of subjecting the foam to the stress imparting the reverse curvature.

However, when employing the foam to which this invention is primarily directed, namely warped cross-linked polyvinyl chloride sheet foam, it is necessary to first adjust at least the surface temperature of the foam upward to an initial temperature necessary for the temporary reverse flexing to take place without damaging the properties of the foam itself, such as without reducing the compressive strength and/or reducing the thickness of the sheet of foam. Accordingly, in order to substantially if not entirely eliminate the warp from the sheet without loss of desirable properties, after the sheet has been heated at least to the minimal temperature necessary for the temporary reverse flexing, the heated sheet must be reasonably promptly (before any substantial amount of cooling takes place), preferably immediately, subjected to the necessary amount of stress for imparting the temporary reverse concave curvature in a degree of curvature about equivalent to the original degree of convex curvature of the warped sheet, and while holding the originally convexly warped surface under the stress in the temporary concave curvature, at least the surface temperature of the composition must be reduced by cooling sufficiently that when the foam is released from the stress, the foam's retained resiliency returns the originally convexly warped face of the foamed sheet from the temporary reverse-flexing to a substantially flat, unwarped sheet of foam.

Figure 2:
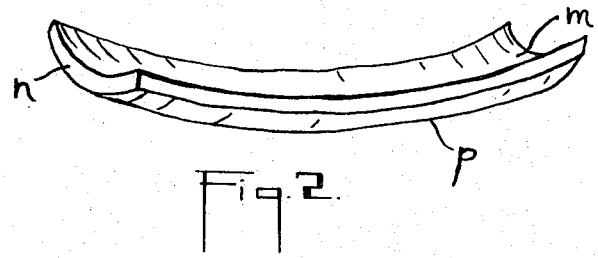

FIG. 1 illustrates the shape of a preferred embodiment of two opposing opposite means for pressing and cooling, at least one of which is movable toward the other, for imparting temporarily a reverse curvature to a sheet of foam such as illustrated in FIG. 2. Typically, each of the pressing means contains coolant channels therethrough for liquid coolant, each having at least one coolant inlet and at least one coolant outlet to the coolant channels.

It is of course within the scope of this invention to employ mixtures of materials in order to obtain a foam having a mixed composition, and the like. Similarly, it is possible to extend the scope of this invention to foams which include a plasticizer present in one percentage or another. However, in a preferred embodiment of this invention, in order to produce a cross-linked polyvinyl chloride sheet which meets the specific required specifications required, for example, for employment as a part of protective barriers around a potentially explosive area, the cross-linked polyvinyl chloride must be substantially pure, aside from conventional agents normally employed in the manufacturing of the cross-linked polyvinyl chloride foam composition. For such a conventional cross-linked polyvinyl chloride foamed sheet, it has been found that for the process of this invention, the minimum temperature to which the surface of the foam must be heated is about 270 degrees Fahrenheit and that the maximum temperature to which the surface of the foam may be heated is about 310 degrees Fahrenheit; if that temperature is exceeded, shrinkage and/or reduction in compressive strength, and/or increased warpage normally results. The preferred temperature range extends from about 280 degrees Fahrenheit up to about 300 degrees Fahrenheit. The time necessary for cooling normally requires at least about 30 seconds, for these temperatures, preferably about 50 seconds up to about 70 seconds, although there is no critical maximum cooling time. The amount of stress required to impart the above stated degree of temporary reverse curvature ranges from about 20 pounds per square inch up to about 60 pounds per square inch, preferably about 25 up to about 30 pounds per square inch.

In order to successfully practice the process of this invention, it has also been unexpectedly discovered that a means at least approximating one or more heating platens must be employed in a manner whereby the surface temperature of the warped (i.e., convex or concave) face of the cross-linked polyvinyl chloride foam becomes rapidly heated to the above indicated temperatures. In a preferred embodiment, at least one platen is in contact with at least a part of the convex face of the sheet. Although it is possible to employ a platen (for heating) having a concave face approximating the degree of convex curvature of the warped sheet, so as to fairly evenly contact the entire convex face of the warped foam, it has been found in actual practice of the inventive process that the sheet of the cross-linked polyvinyl chloride foam has at least sufficient flexibility prior to heating that a substantially flat, if not entirely flat platen, may be employed under a minor pressure sufficient to flex and substantially temporarily straighten the warped sheet while heating, without any significant loss of compressive strength nor any significant reduction in thickness of the foamed sheet. Accordingly, in a preferred embodiment of this invention, at least two substantially flat platens are employed, one against the convex face of the sheet, and the other against the concave face of the sheet sufficiently to preferably rapidly increase the surface temperatures of each of the convex face and the concave face of the sheet to the above stated initial temperature. Although the invention is not to be limited by the following theory, it is believed that a preferred embodiment of the process results from heating the surface of at least the concave face of the sheet, and preferably each of the concave and the convex faces of the sheet, sufficiently rapidly that the entire depth of the foam extending between the two surfaces is not raised to the above stated initial temperature, whereby there is no significant loss of the initial compressive strength nor of the initial thickness of the sheet of foam, but whereby the stress present in the surface layers of the foam possibly is relieved by virtue of the above-stated initial temperature. This theory is partially confirmed by virtue of the fact that it was unexpectedly found that the use of platens could not be replaced by merely placing the sheet of foam into an oven and heating to the above stated minimum temperature, because when placed in an oven at the minimum temperature, the sheet of foam promptly increased in the degree of warp, there was an eventual loss of desired properties such as compressive strength and original thickness, and blisters appeared on the face of the sheet, as discussed above. However, it has nevertheless been found that when employing one or more platens to heat the sheet of foam, the platen need not necessarily actually touch the warped sheet of foam, but need be only very close to the surface of the foam, i.e., substantially contacting the convex face of the warped sheet of foam, sufficiently that the surface(s) of the foam is (are) rapidly and promptly heated to the above stated minimum temperature. Nevertheless, in a preferred embodiment, the one or more platens are in actual contact with at least one, preferably both, of the convex and the concave faces of the warped sheet of cross-linked polyvinyl chloride foam.

As stated above, a novel apparatus also constitutes a part of this invention, for imparting the reverse curvature. However, as stated above, the process may be employed in the absence of such an apparatus. For example, it has been found that the process may be practiced by use of flexible metal sheets, and even by use of a person's hands (insulated against the heat) to impart the required stress to a warped sheet to obtain the temporary reverse degree of curvature approximating the degree of initial convexness of the warped surface of the sheet of foam, while water-cooling the flexed heated sheet. However, in order to employ the process on a practical commercial production scale, it is at least preferred to employ the novel apparatus of this invention. The apparatus may be broadly described as an apparatus for removing warp from a sheet of foam, comprising an unheated forming means for temporarily imparting a sufficient amount of stress across a convexly warped face of a layer of a heated substantially rigid thermoplastic cellular composition heated to at least a minimum temperature necessary for flexing said convex face into a reverse degree of concave curvature up to a maximum temperature above which at least one of compressive strength and thickness of said composition becomes substantially reduced, to temporarily impart and hold the originally convexly warped face in a predetermined shape having a resulting concave curvature about equivalent in degree to that of the originally convexly warped face, said forming means for exerting said stress being limited to a pressure exertion per square inch at least below a damaging pressure which would substantially reduce at least one of said compressive strength and said thickness, and said forming means including a liquid cooling means whereby said heated composition may be substantially cooled substantially while under said stress, whereby said convexly warped face results in a substantially flat and unwarped face when removed from said stress.

The forming means for imparting the concave curvature in the convexly warped face of the sheet, includes at least a first press characterized by a convex face for imparting the necessary stress discussed above, and in a preferred embodiment, the convex face is convex in at least each of both longitudinal and transverse dimension of the convex face of the first press. As noted above, the cooling means is a liquid cooling means, it having been found that mere air cooling is normally substantially inadequate for purposes of this process to cool the forming means, for an apparatus of any practical commercial value for a large scale production process. Also, for reasons discussed above, it is desirable to promptly cool the sheet of foam as soon as possible after the necessary stress is imparted in order to avoid a loss of compressive strength and a reduction in thickness, and to avoid possibly further warpage as a result of the sheet of foam remaining at the elevated initial temperature for too long a period of time. Although any conventional liquid coolant may be employed, in a preferred embodiment water is employed as the coolant. In a further preferred embodiment, the cooling means includes a means for circulating the liquid such as a water-circulation means.

In a preferred embodiment of this invention, as discussed in the process above, it is preferred to have a second press having a convace face in an opposite opposing relationship to the convex face of the first pressing means, in which the concave face of the second press has a degree of concave curvature about equivalent to that of a convex face of the first press, at least one of the first and the second press being adapted to move toward the other. By the employment of the second pressing means described above, the second pressing means serves to facilitate forming a reverse-curvature, i.e., a concave curvature of the initially convex curvature of the wraped sheet.

In a preferred embodiment of the above-described apparatus of this invention, at least one, and preferably both, of the above-described pressing means are adjustable in the degree of at least each of the longitudinal and the transverse convexness of the face of the pressing means, whereby the amount of reverse curvature to be imparted to a warped sheet may be varied by merely adjusting the degree of convexness of the first press and the degree of the concaveness of the second press. Thereby, the same apparatus may be employed for correcting varying degrees of warpage of various different sheets of foam. The amount of warp in any particular sheet of cross-linked polyvinyl chloride, for example, is dependent upon the initial thickness of the bun, the number of sheets obtained from a particular bun by sawing, and other similar typical factors. Accordingly, it is desirable that the apparatus be adaptable for use in the correction of warpage of varying degrees of curvature.

Another important characteristic of the apparatus of this invention is that it be adapted to carefully control the amount of stress within critical limits, i.e., the number of pounds per square inch of pressure, in order that the amount of stress be insufficient to reduce the thickness and/or the compressive strength by a substantial amount, preferably insufficient to reduce the thickness of a corsslinked polyvinyl chloride foamed sheet by more than about 1/16 of an inch, preferably not more than 1/32 inch, and preferably insufficient to reduce compressive strength more than about 10 pounds per square inch, for a sheet having a density of about 4.1 to about 5.7 tons per cubic foot. As is discussed below, there is at least some significant evidence that the properties such as compressive strength and the corresponding modulus of elasticity actually improve (i.e., increase) during the process of this invention for removing warpage. The above-staged range of up to about ten pounds reduction in compressive strength merely reflects an approximation of the variation that may be expected normally for different segments within the same sheet; by the vary nature of the method of measuring the compressive strength of a sheet, a different segment of the sheet must be measured after the warpage removal process than employed for measurement before the process, since the test destroys the utility of the segment measured.

Referring to the FIG. 1, $a$ is an upper press having a concave pressing-face $b$. Liquid coolant enters through coolant inlet $f$ and exists through coolant outlet $g$. Movable shaft $c$ supports press $a$ and extends from the hydraulic press cylinder $d$ which is supported by support $e$. A lower pressing means having a convex face $h$ is supported by supports such as designated by $j$. In FIG. 2, a typically shaped cross-linked polyvinyl chloride foam sheet $m$ (concavely warped) in a warped condition is illustrated, having both transverse warp $n$ and longitudinal warp $p$. The warped sheet of FIG. 2 would be placed between the upper and lower presses of FIG. 1 in a manner whereby convex face $p$ of the sheet is in contact with the lower press convex face $h$. At the end of the FIG. 2 sheet designated $n$, transverse warpage across the sheet is illustrated, whereby the sides of the sheet are curved upward resulting in a concave curvature on top of the sheet and a convex curvature on the bottom of the sheet. Also, the opposite ends of the sheet curve upward whereby the sheet is longitudinally warped, with the convex warpage on the bottom face of the sheet designated $p$, and the concave warpage on the top face of the sheet designated $m$.

Although the process of this invention may be employed for any polymer characteristically known in the art as a rigid thermoplastic cellular composition, a preferred group of such foamed polymers include (a) a polyvinyl halide composition such as typically polyvinyl chloride, (b) a polyalkylene polymer such as typically polyethylene or polypropylene, (c) a polyvinylidene halide composition such as typically polyvinylidene chloride, (d) acrylonitrile-alkene-vinylbenzene such as typically acrylonitrile-butadiene-styrene copolymer, (e) a polytetrahalo-alkylene such as typically polytetrachloroethylene, and (f) a silicone such as typically a polyorganosiloxane or a phenylsiloxane, for example, and the substituted forms thereof by substituents such as any alkane and/or any halogen substituent. Typical alkanes would include, for example, methyl, ethyl, propl, butyl, and the like and the halogen substituents would include fluorine, chlorine, bromine, and iodine substituents. Of this broad class of preferred rigid thermoplastic cellular compositions, the preferred foam of this invention is a cross-linked polyvinylhalide composition, particularly a cross-linked polyvinyl chloride composition such as a cross-linked grafted polyvinyl chloride polymer of the type described in U.S. Pat. No. 3,200,089, patented on Aug. 10, 1965, the entire disclosure thereof being hereby incorporated by reference. This general type of foam also is discussed as the Kleber-Colombes rigid foam, in "Chemical & Engineering," Dec. 12, 1966. In particular, the preferred cross-linked polymer employed in this invention may be initially prepared by a process and employing the quantities of ingredients as follows.

The quantity of polyvinyl chloride used depends on the final density it is wished to obtain; it generall ranges between 20 and 95 percent and preferably between 30 and 70 percent by weight of the initial mixture.

The isocyanate used preferably is a polyisocyanate such as the p,p',p''-triisocyanate of triphenylmethane (named Desmodur R by Farbenfabriken Bayer of Germany), or else a diisocyanate of diphenylmethane, toluene 2,4-diisocyanate, toluene 2,6-diisocyanate and the like; these isocyanates also can be used in the form of a mixture of two or more of these products. The total amount of polyisocyanate used depends on its nature and the result which it is desired to obtain, generally ranging between 0.5 and 60 percent, preferably between 5 and 50 percent by weight of the initial mixture.

For this cross-linked polyvinyl chloride, the anhydride to be used must be an anhydride which is copolymerizable with a vinylidenic monomer; for example, acrylic anhydride, citraconic anhydride, itaconic anhydride, maleic anhydride and the like. The amount of this anhydride incorporated into the mixture depends upon the final density it is wished to obtain after expansion of the object, and generally ranges between 2 to 30 percent by weight of the initial mixture.

The vinylidenic monomers used are those which polymerize or copolymerize by a radical reaction and which contain at least one $CH_2=C<$ grouping. A mixture of these monomers also can be used. Among the vinylidenic monomers are included open chain compounds with conjugated diene linkages such as butadienic hydrocarbons comprising 1,3-butadiene, isoprene, dimethyl-1,3-butadiene and the like, trienes such as myrcene, the vinylic or vinylidenic compounds such as vinyl chloride, vinylidene chloride, styrene, p-chlorostyrene, 3,5-dichlorostyrene, p-methoxystyrene, esters, nitriles and amides of acrylic and alpha-alkyl acrylic acids such as methyl acrylate, octyl acrylate, methyl methacrylate, lauryl methacrylate, acrylonitrile, alpha choroacrylonitrile, methacrylonitrile, dimethylacrylamide and the like, vinyl pyridine, vinyl benzoate, vinylic ketones and esters, vinyl carbazole and the like, ethylene, propylene and the like, isobutylene, divinylbenzene and the like, and compounds containing both the olefinic and acetylenic linkages such as vinyl acetylene, vinyl ethynyl carbinol and the like.

Apart from the monomers characterized by a $CH_2=C<$ grouping, the process of manufacturing the composition also is applicable to monomers with a $CF_2=C<$ grouping, such as tetrafluoroethylene and the like.

The quantity of vinylidenic monomer used normally ranges between about 2 to 30 percent by weight of the initial mixture; in many cases it is advantageous to add approximately the same amount of this or these monomers as of the ethylenic anhydride.

It is advantageous to incorporate a catalyst ensuring the polymerization or copolymerization of the vinylidenic polymer with the copolymerizable anhydride into the mixture. A large number of products well known to those skilled in the art can be used to catalyze such a polymerization.

The quantity of catalyst to be employed depends on the nature of the catalyst and the quantity of monomer to be polymerized; it generally ranges between about 0.1 and about 10 percent by weight of the actual mixture.

It is clear that vinyl chloride copolymers or mixtures of copolymers and polymers of vinyl chloride and other polymers are within the scope of this present invention.

This preferred cross-linked polyvinyl chloride composition is a reaction product of precursor reactants comprising preferably polyvinyl chloride, a polyisocyanate, a blowing agent which decomposes under the action of heat, at least one vinylidenic monomer polymerizable by a radical reaction and an ethylenically unsaturated carboxylic acid anhydride polymerizable with said monomer.

In a subsequent step, a reaction with water produces the finished cross-linked foam, referred to as a "bun" after the "growing" of the "bun."

For the process of this invention, of substantially or entirely eliminating warpage from sheets of foam, in a preferred embodiment of the process as applied to the removal of warpage from a warped sheet of cross-linked polyvinyl chloride foam, there are no known limits on the lower or upper densities of the foam that may be employed in the process of this invention. For the cross-linked polyvinyl chloride foam sheets, typically it is well within the scope of this invention to employ foamed sheets having densities ranging from about one pound up to about ten pounds per cubic foot, preferably from about 1.5 pounds to about 6 pounds.

Typically, this inventive process is used on foamed polyvinyl chloride sheets having dimensions of approximately 46 inches by 84 inches by 1.25 inches (measurements of the bun) of the density of about 4 pounds per cubic foot.

The following examples merely illustrate random typical embodiments of this invention, and are not intended to limit the scope of the invention described above and claimed in the appended claims.

In the following examples, the degree of warpage, as well as the degree of curvature of the face of the forming press is expressed in terms of inches as measured from the peak of the dome of the curvature to a line extending perpendicularly from, a plane straight line between opposite ends of the warped sheet as a measure of the longitudinal warpage, and extending to a second plane between the opposite sides of the warped sheet as a measure of the transverse warpage of the sheet of foam. Normally the longitudinal warpage (i.e., the length of the perpendicular) ranges from about 0.5 inch up to about 4 or 5 inches, for a bun having the above-described dimensions. Normally the transverse warpage is considerably less than the longitudinal warpage. In practice, it has been found that for use as a part of the barrier surrounding a potentially hazardous explosive area, when bolted through bolt holes placed through the laminated sheet of foam and stainless steel, a transverse warpage of $3/16$ inch resulted in a cracking of the sheet, the cracking beginning at the hole for the bolt. However, a transverse warpage of $1/8$ inch proved to be insufficient warpage to cause breakage. Accordingly, by the process of this invention, the removal by the proces of this invention of the transverse warpage at least below the $3/16$ of an inch level served to make the sheets of polyvinyl chloride foam usable for purposes of the barrier surrounding an explosive area. In the tests conducted, it was also confirmed that thickness of the sheets was reduced less than $1/32$ of an inch. Thus, sheets need not always be completely free of a minor degree of warpage. For example, 0.375 inch thick, 4.1 and 5.7 pounds per cubic foot density sheets of foam of cross-linked polyvinyl chloride which have been made contain a low enough degree of warp that they have been used successfully in sandwiching for structural panels for the transportation industry with a variety of skins such as glass-epoxy, aluminum, titanium, polyester-glass, ranging in thickness down to 0.012 inch thick. Cross-linked polyvinyl chloride foamed sheets of 2 pounds per cubic foot density and about 0.75 inch thickness have been used with asbestos-cement skins by a leading computer and electronic equipment manufacturer. However, for the same equipment manufacturer, $15/16$ inch thick, 2 pounds per cubic foot density cross-linked polyvinyl chloride foamed sheets have contained sufficient warpage to constitute problems. Therefore, as fully discussed above, warpage is a real problem successfully overcome by the process of this invention.

EXAMPLE 1

The following process procedures were followed in flattening warped foamed cross-linked polyvinyl chloride sheets.

Step I.—Full size sheets, approximately 4 foot by 7 foot by 1¼ inch, of 4 pounds per cubic foot foamed polyvinyl chloride, which were badly warped or bowed were placed in a hot press at a temperature of 280 degrees Fahrenheit to 300 degrees Fahrenheit for approximately one minute, plus or minus ten seconds. Nominal thickness stops were used between opposing heating presses (platens) to insure that no excessive pressure was applied to the sheet during heating.

Step II.—The heated sheet was then removed and quickly placed in the forming rig. The top curved plate of the forming rig was quickly dropped by a hydraulic device, thus placing a reverse curvature in the sheet while under pressure of approximately 27 pounds per square inch. The sheet remained in the forming rig for one minute to allow cooling while curved. A longer holding (cooling) time would be required if the forming rig were allowed to heat up during production runs. The sheet was then removed and was essentially flat. The amount of reverse curvature or deflection used to flatten a sheet was 3½ inch. The amount of deflection could be increased or decreased by adjustments incorporated in the forming press.

EXAMPLE 2

The procedure of Example 1 was followed for a sheet having a density of 4.0 pounds per cubic foot. The following Table I discloses the density, the compressive strength, the modulus of elasticity, and the thickness both before and after treatment.

TABLE I

| Property | Before | After |
|---|---|---|
| Density (pound per cubic foot based upon the average of three tests) | 4.0 | 4.0 |
| Compressive strength (p.s.i. at 10% deformation) | 128 | 130 |
| Modulus of elasticity (p.s.i. in compression) | 5,000 | 6,250 |
| Thickness (in inches) | 1.31 | 1.30 |

The results illustrated in Table I disclose that there was no significant change in density, compressive strength, modulus of elasticity, and thickness. Moreover, the compressive strength and modulus of elasticity each appear to have improved each reflecting a slight increase—in contrast to a loss that might have been expected prior to the discovery of the novel process of this invention. The modulus of elasticity normally increases or decreases in direct proportion to an increase or decrease in compressive strength; the fact that the measured compressive strength and the modulus of elasticity each did not decrease in the Example 2 is significant and weighty evidence of the great utility of the proces of this invention whereby no damage occurred in the properties as a result of the process, in addition to the substantial removal of the warpage.

It should be understood that the scope of this invention is limited only to the extent that limitations appear in the appended claims, and that it is within the scope of this invention to employ such equivalence and modifications as would be obvious to a person or ordinary skill in the art.

What I claim is:

1. A process for removing warpage curvature from a foamed sheet of rigid thermoplastic cellular polyvinyl chloride polymer composition and straightening it to a substantially flattened condition without impairing either the compressive strength or the thickness of the sheet, comprising first subjecting a warped face of a bowed sheet of a substantially rigid thermoplastic cellular polyvinyl chloride polymer composition to heat, thereafter subjecting the heated sheet of substantially rigid thermoplastic cellular polyvinyl chloride polymer composition to a stress in an amount sufficient to temporarily impart and hold said warped face of the bowed sheet in a reverse curvature about equivalent to original degree of curvature of the said warped face, said predetermined amount of stress being limited to a maximum pressure exertion per square inch above which damaging pressure would substantially reduce said compressive strength or said thickness, and then cooling said polymer composition while said sheet is retained under said stress, whereby said warped face returns from the temporarily imparted and held reversed curvature and straightens into a substantially flat and unwarped face when removed from said stress.

2. A process according to claim 1, in which said composition comprises substantially cross-linked polyvinyl chloride foam, in which said warped face includes bowed curvatures extending both longitudinally and transversely across said warped face, in which said stress is imparted across both of said longitudinal and said transverse curvatures, in which said minimum temperature is about 270 degrees Fahrenheit, in which said maximum temperature is about 310 degrees Fahrenheit, in which said warped face is held under said stress for at least about 30 seconds during said cooling, in which said stress ranges from about 20 pounds per square inch up to about 60 pounds per square inch, and in which a platen is in a heat-transfer contact with said warped face.

3. A process according to claim 2, in which said minimum temperature is about 280 degrees Fahrenheit and said maximum is about 300 degrees Fahrenheit, in which said composition is held under said stress for about 50 seconds up to about 70 seconds during said cooling, and in which said stress ranges from about 25 up to about 30 pounds per square inch.

References Cited

UNITED STATES PATENTS

| 2,886,853 | 5/1959 | Herman | 264—230 X |
| 3,000,057 | 9/1961 | Swedlow | 264—230 X |
| 3,286,004 | 11/1966 | Hill | 264—45 |
| 3,324,210 | 6/1967 | Aykanian | 264—45 |
| 3,420,363 | 1/1969 | Blickensderfer | 264—321 X |

FOREIGN PATENTS 215,089   10/1957   Australia.

PAUL A. LEIPOLD, Assistant Examiner

U.S. Cl. X.R.

264—230